April 16, 1940.                    W. C. BETZ                    2,197,748
                                  SEAL BEARING
                               Filed May 6, 1937
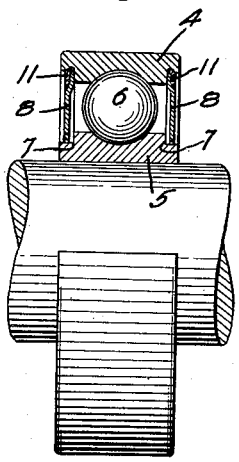
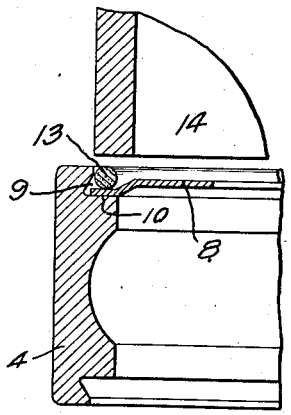    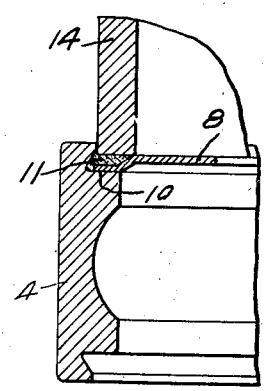
INVENTOR
WILLIAM C. BETZ
BY
*Mitchen Beckert*
ATTORNEYS.

Patented Apr. 16, 1940

2,197,748

UNITED STATES PATENT OFFICE 2,197,748

SEAL BEARING

William C. Betz, New Britain, Conn., assignor to The Fafnir Bearing Company, New Britain, Conn., a corporation of Connecticut Application May 6, 1937, Serial No. 141,056

1 Claim. (Cl. 308—187.2)

My invention relates to a bearing seal.

As is well known, metal seals are often pressed, crimped or spun into an undercut or other groove in the outer ring of an anti-friction bearing. Such seals are very effectively held but, due to slight inaccuracies of manufacture or to faulty pressing or spinning operations, the outer ring is quite often seriously distorted and gotten out of round and is so held by the seal. Such distortion of the outer ring causes the bearing to deteriorate rather quickly and such bearings having out of round rings are a source of considerable economic loss. It is sometimes possible to correct the out of roundness but the operations incident to such correction sometimes loosen the seal undesirably.

It is the principal object of my invention to provide a bearing with a seal securely held in place and which cannot distort the ring to which it is applied.

It is another object to provide a bearing with a seal permanently secured thereto which cannot distort the ring carrying the seal and yet which may be removed when necessary by the moderate application of heat.

Another object is to provide an improved method of securing a bearing seal to a bearing ring.

In the drawing which shows, for illustrative purposes only, a preferred form of the invention and certain steps in its manufacture—

Fig. 1 is an edge view in quarter section of a ball bearing illustrating features of the invention;

Fig. 2 is an enlarged fragmentary sectional view of an outer bearing ring illustrating one step in the sealing method; and Fig. 3 is a view similar to Fig. 2, showing the final step in the manufacturing method.

In the drawing, the bearing consists of an outer ring 4 and an inner ring 5 with interposed anti-friction bearing members, such as balls 6 in the present instance fitting in raceways and holding the two rings together. The inner ring at the edges may be rabbeted, as indicated at 7—7, and metal or other seal plates 8—8 are secured to the outer bearing ring and extend across the space between the two rings and into the rabbeted edges of the inner ring. My invention relates particularly to the seal and how it is held in place.

In the form shown, wherein the outer ring carries the seals, the edge of the ring is provided with an undercut groove 9, leaving an abutment or shoulder 10, upon which the outer edge of the seal plate 8 rests. The diameter of the plate 8 is preferably such that it may be readily applied to the groove without substantial distortion and when a seal plate 8 is in place on the shoulder 10 it preferably clears the bottom of the groove, so that there is no possibility of distortion of the ring by a seal plate which may be oversize or out of round.

The seal is held in place by means of an adequate body of readily fusible metal 11, preferably of a character which expands on cooling, so as to very securely hold the seal to the outer ring. The seal may be conveniently secured by first placing the same on the shoulder 10 and then applying a ring 13 of readily fusible metal, such as a metal known in the trade as Cerromatrix (bismuth, lead, tin, antimony alloy) which has a relatively low melting or pouring point, say 250° to 300° F., and which expands slightly on cooling and is about as hard as a good hard brass. The ring of metal 13, resting on the seal 8, is then fused, preferably by means of an annular heater member, such as a cylinder of metal 14, heated to a temperature sufficient to melt the readily fusible ring 13. The heater 14 is moved down into contact with the ring 13 until the latter is fused and the fused metal runs down into the undercut groove 9 and around the outer edge and over the marginal top of the seal plate 8 and, when the heater 14 is removed, soon hardens into a solid ring having about the form shown in Figs. 1 and 3.

The readily fusible metal in the preferred form expands on cooling, so that it provides a very tight, secure joint between the bearing ring and the seal plate. Since the body of fusible metal is of comparatively thin section, the slight expansion on cooling will have no appreciable effect in distorting the outer ring and yet the seal will be substantially as securely held in place as if it had been crimped or spun into the groove.

By the means disclosed the seal may be very readily and quickly secured and the amount and duration of the heating is so slight that the bearing ring cannot be damaged nor the heat treatment in any wise detrimentally affected.

While I have shown a preferred form of heater, as a cylinder 14, it is to be observed that the ring of Cerromatrix or other suitable readily fusible metal may be fused by other means, such as a flame or suitable type of electric heating device.

While the seal is held in place as securely as those which are pressed or spun into an undercut groove and which cannot be practicably removed, it will be seen that a seal held in accordance with my invention may, when occasion demands, be removed by refusing the metal, as by means of the heater 14 and, while the metal is still fused, withdrawing the seal.

While the invention has been disclosed in connection with a ball bearing and the seal applied to the outer ring thereof, it is to be understood that the invention may be otherwise embodied and that various changes and modifications may be made within the scope of the invention as defined in the appended claim.

I claim:

A bearing, including a bearing ring with a circumferential groove therein, a seal adjacent said groove, and a body of a fusible metal of a character to expand on cooling in said groove and over said seal for holding the latter in place on said ring.

WILLIAM C. BETZ.